March 10, 1959
O. H. BANKER
2,876,548
OIL LEVEL GAUGE
Filed July 26, 1955
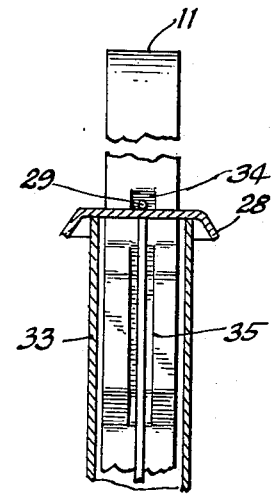
FIG. 1
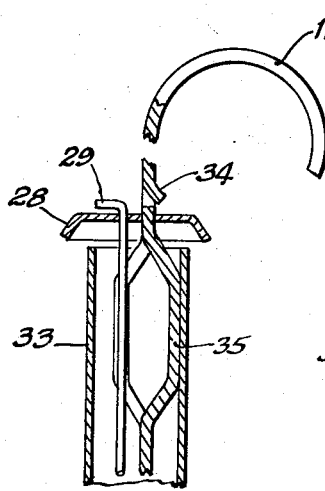
FIG. 2
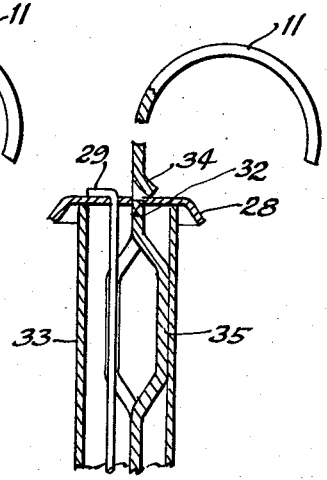
FIG. 3
FIG. 5
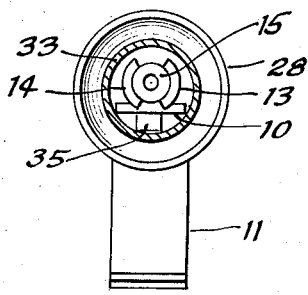
FIG. 4
INVENTOR.
Oscar H. Banker
BY
Charles O. Vytlech
Attorney

United States Patent Office 2,876,548
Patented Mar. 10, 1959

2,876,548

OIL LEVEL GAUGE

Oscar H. Banker, Evanston, Ill., assignor to New Products Corporation, Skokie, Ill., a corporation of Delaware Application July 26, 1955, Serial No. 524,427

5 Claims. (Cl. 33—126.4)

This invention relates to oil gauges for measuring the quantity of oil in the crankcase of an internal combustion engine.

Oil gauges as presently constituted comprise a flat metal rod with "Full" and "Add" marks stamped in the lower end thereof to indicate satisfactory and low conditions respectively of the oil in a crankcase. The rod normally is held frictionally in an opening in the crankcase, with the upper portion thereof extending to some point readily accessible from the exterior of the engine. A stop on the rod engages the exterior of the crankcase and provides a reference point from which the oil level is measured.

To secure a reading from the gauge it is necessary to withdraw the rod, wipe off the lower end, reinsert the rod until the stop strikes the crankcase and then withdraw it again for a reading. The wiping of the lower end is an unsatisfactory operation, requiring that the attendant keep on hand a supply of paper or rags, which become oil soaked and add to the work of keeping clean a service station or other premises where the oil level is checked.

An object of this invention is the provision of an oil level gauge of the rod type which does not require that it be wiped off before a reading can be made from it.

Another object of this invention is the provision of an oil level gauge for an internal combustion engine crankcase which provides a reading by allowing the oil to enter a transparent tube in which it is trapped while the tube is withdrawn for a visual inspection of the level of the trapped oil.

A specific object of this invention is the provision of an oil level gauge which provides a reading by allowing the oil to enter a removable transparent tube, with valve means automatically operable by the motion of inserting the gauge into and withdrawing it from its opening in the crankcase for freeing and trapping, respectively, the oil in the transparent tube.

Among the more general objects of this invention are the provisions of an oil level gauge which need not be wiped off before a correct reading can be obtained therefrom, said gauge being interchangeable with and only slightly more expensive than those now in use, and easy to maintain in good working order.

These and other objects of this invention will become more apparent from the following detailed description when taken together with the accompanying drawings in which, Fig. 1 is a front elevational shortened view, partly in section, of an oil level gauge constructed in accordance with this invention;

Fig. 2 is a side elevational view of the gauge of Fig. 1, showing the relationship of the parts thereof when the gauge is conditioned to give a reading;

Fig. 3 is a side elevational view, in section, of the upper portion of the gauge showing the relationship of the parts thereof when the gauge is in place in the engine;

Fig. 4 is a bottom view of the gauge of Fig. 1 looking in the direction of the arrows 4—4 of that figure; and Fig. 5 is a section taken through the gauge of Fig. 3 from the location, and looking in the direction of, arrows 5—5 thereof.

Referring now to the drawings for a detailed description, the gauge is comprised of a length of flat steel strip 10 which constitutes the general frame of the gauge. Said strip is of sufficient length to form a curved handle 11 at its upper end which extends upwardly and outwardly of the crankcase to some point readily accessible to an attendant. The sides 12 and 13 of the lower end 14 are curved forward to form a tubular socket within which is received the lower end of a transparent tube 15. The bottom of the opening formed by the socket is partially closed by crimping the lower edge 16 thereof radially inwardly to form an abutment which definitely locates the lower end of tube 15 relative to the strip 10.

Tube 15 may be made of any transparent material capable of withstanding temperatures up to 300° F. Thus, glass and some of the clear synthetic resins may be satisfactory. Its length and disposition on the strip are such that the upper portion 17 is above the highest level of the oil normally to be encountered in the engine. Said upper portion is secured to strip 10 by a clip 18 (Fig. 5) which passes around tube 15 and then into a slot 19 the transverse dimension of which is less than the external diameter of the tube so that the clip is wrapped around approximately 270° of the periphery of the tube. The ends 20 and 21 of clip 18 are bent sharply against the back of strip 10 to lock tube 15 securely against the strip. The 270° wrap of the clip around the tube provides sufficient friction to ensure a firm location of the tube at the lower end of the strip.

It may be observed that the strip is appreciably wider than the tube and hence extends well beyond both sides of the tube. This provides a flat surface 22 upon which lines and legends indicating low and high oil levels may be stamped, said lines and legends being clearly visible from the tube side of the strip. The extending sides also provide some protection for tube 15 against accidental blows which it might receive during handling.

It is contemplated that tube 15 will be open at both ends when the gauge is in place in the crankcase to allow the oil to enter and fill the tube to a point corresponding to the level of the oil in the crankcase. Regardless of oil splashed on the exterior of the tube, the oil within the tube will be readily visible through the splashed extending film since all oils have a characteristic color when present to a depth greater than the depth of the film formed on the surface. The oil, however, will not remain in the tube when the tube is withdrawn to take a reading unless the top of the tube is closed to trap the oil in the tube.

In the form illustrated herein the upper end of the tube is closed by a valve which is automatically held open while the tube is immersed in the oil, but is instantly closed upon initial movement of the gauge out of the crankcase. The valve is shown at 23 and is comprised of a small apertured cylinder 24 to the bottom surface of which is affixed by cementing or otherwise a washer 25 of relatively soft material such as leather, felt, rubber or other substance capable of withstanding the temperatures encountered in the crankcase of an internal combustion engine. Cylinder 24 is pressed upon a thin rod 26, the diameter of which is less than the internal diameter of tube 15, the cylinder being located a short distance above the lower end of the rod so that the rod may extend into the tube and thus serve to center the valve with respect to the tube. Since the diameter of the rod is less than the internal diameter of the tube, the presence of the rod in the tube will not materially hinder the egress of displaced air from the tube when oil enters it from the bottom.

Valve rod 26 extends upwardly through a suitable opening in an abutment 27, formed as a tab punched out of the central region of strip 10, and thence through an opening in a cap 28 where the upper end 29 is bent at right angles to the vertical axis of the rod to form a stop. Valve 23 is constantly urged toward the upper end 30 of tube 15 by a spring 31 which encircles rod 26 and is compressed between cylinder 24 and abutment 27. Whether valve 23 actually contacts tube 15 is determined by the position of cap 28 relative to strip 10.

It may be observed that cap 28 is provided with a rectangular opening 32 through which strip 10 passes. Cap 28 is thus slidable on strip 10 and can assume a plurality of positions thereon. When the gauge is in place in the crankcase, it may be disposed within a tube 33 which is fixed to the engine block. Cap 28 is adapted to fit over the end of tube 33 and to bear thereagainst to seal off the tube from exterior grit, dirt, etc. Movement of strip 10 into tube 33 is limited, however, by a stake 34 struck from strip 10 above cap 28, said stake striking the cap and forcing the cap against the end of tube 33. This condition is illustrated in Fig. 3. It may be observed that end 29 of valve rod 26 abuts on cap 28 and that valve 23 is off the end 17 of tube 15, thus allowing free movement of air into and out of tube 15.

When the gauge is raised off tube 33, the cap and valve assume the positions shown in Fig. 2. Thus cap 28 is free to move downwardly on strip 10 thereby freeing valve rod 26 to move downwardly under the action of spring 31 and cause valve 23 to be held firmly against end 17 of tube 15. Air is thus prevented from entering or leaving the upper end of tube 15, and any oil in the tube at the time valve 23 is closed will remain there. Thus, the gauge may be moved about and read without disturbing the level of the oil in the tube.

Strip 10 may be provided with the usual friction shoe 35 which slides against the interior of tube 33 and serves to hold the gauge in place therein.

Although the description of this invention has been directed to its use as an oil level gauge, obviously it can be used to indicate the level of other liquids and it is understood therefore that the foregoing description is illustrative of a preferred embodiment of the invention and that the scope of the invention is not to be limited thereto, but is to be determined by the appended claims.

I claim:

1. A liquid level indicator comprising an elongated frame having a portion adapted to be inserted into the liquid to be checked, a container for said liquid, said container having a tube through which the frame is adapted to be inserted, a cap for the tube slidable on the frame, means on the frame for limiting the sliding action of the cap thereon in one direction, a transparent tube secured to the lower end of the frame in such manner that one end of the said transparent tube is adapted to extend partly into the liquid, said transparent tube being open at both ends to allow the liquid to enter therein and the displaced air in the transparent tube to escape therefrom, valve means for closing one of the ends of the transparent tube, and means movable with the valve means and adapted to be contacted by the cap for holding the valve means open when the said frame portion is inserted into the first mentioned tube to cause the cap to contact the movement limiting means and closed when the said cap is away from the movement limiting means.

2. A liquid level indicator comprising an elongated flat frame having a portion adapted to be inserted into the liquid to be checked, a container for said liquid having an opening through which the frame is adapted to be inserted, a cap for the container adapted to cover the opening, said cap having an opening therein to receive the frame with a sliding fit and said frame extending through said cap opening, an abutment on the frame adapted to be contacted by the cap when the frame is inserted into the opening in the container, a transparent tube secured to the lower end of the frame in such manner that one end is adapted to extend into the liquid while the opposite end thereof is above the liquid, said tube being open at both ends to allow the liquid to enter therein and the air in the tube to escape therefrom, valve means for closing one of the tube openings, a valve rod connected to the valve means, said cap having a second opening through which the rod extends, resilient means normally urging the valve toward the said one tube opening to close said tube opening, and an abutment on said rod adapted to be contacted by the cap whereby to move the valve against the action of the spring to open the said tube opening upon sliding movement of the cap on the frame.

3. A liquid level indicator comprising a frame having a portion adapted to be inserted into the liquid to be checked, a cap slidable on the frame, stops on the frame for limiting sliding movement of the cap on the frame, a container for the said liquid, means on the container adapted to contact the cap for limiting through one of said stops the movement of the frame into the liquid, a transparent tube open at both ends and secured to the frame in such manner that one end is adapted to extend partly into the liquid when the cap contacts the movement limiting means on the container, valve means for closing one of the transparent tube ends, and means operable by movement of the cap for holding said valve means open when the frame portion is moved into the liquid and the cap contacts the frame movement limiting means, and for holding the valve means closed after the initial movement of the said frame portion and cap away from the movement limiting means.

4. A liquid level indicator comprising a frame having a portion adapted to be inserted into the liquid to be checked, a container for the liquid having a tube extending outwardly therefrom, means on the frame and cooperating with the tube for limiting the movement of the frame into the liquid, a transparent tube open at both ends and secured to the frame in such manner that one end is adapted to extend partly into the liquid when the movement of the frame into the container is limited by said means, valve means for closing one of the transparent tube ends, said valve means comprising a cylinder of greater diameter than the diameter of the opening in the transparent tube, a valve rod arranged concentrically with respect to the cylinder and passing therethrough into the transparent tube opening so as to center the cylinder with respect to the tube, said frame movement limiting means being slidable on said frame, and means operable by the frame movement limiting means for operating the valve rod to hold the valve means open when the transparent tube is disposed in the liquid and to close the valve means by the initial movement of the said frame portion and tube out of the liquid, the means on the frame for limiting the movement of the frame into the liquid comprising a cap adapted to abut on the first-mentioned tube and slidable on the frame, and said movement limiting means including an abutment on the frame adapted to be contacted by the cap when the frame is moved through the first-mentioned tube toward the container.

5. A liquid level indicator comprising a frame having a portion adapted to be inserted into the liquid to be checked, a container for the liquid having a tube extending outwardly therefrom, means on the frame and cooperating with the tube for limiting the movement of the frame into the liquid, a transparent tube open at both ends and secured to the frame in such manner that one end is adapted to extend partly into the liquid when the movement of the frame into the container is limited by said means, valve means for closing one of the transparent tube ends, said valve means comprising a cylinder of greater diameter than the diameter of the opening in the transparent tube, a valve rod arranged concentrically with respect to the cylinder and passing therethrough into the transparent tube opening so as to center the cylinder with respect to the tube, said frame movement limiting means being slidable on said frame, and means operable by the frame movement limiting means for operating the valve rod to hold the valve means open when the transparent tube is disposed in the liquid and to close the valve means by the initial movement of the said frame portion and tube out of the liquid, said means on the frame for limiting the movement of the frame into the liquid comprising a cap adapted to contact the first-mentioned tube and slidable on the frame, said cap having an opening through which the valve rod extends, an abutment on the valve rod on the side of the cap remote from the container, an abutment on the frame on the side of the cap remote from the container, and resilient means normally urging the valve rod in a direction to cause the abutment thereon to contact the cap, said cap when contacting the first-mentioned tube serving to pull the valve rod and valve against the action of the spring to hold the valve open when the frame is inserted into the container to its limiting position.

References Cited in the file of this patent

UNITED STATES PATENTS

| | | |
|---|---|---|
| 1,417,496 | Carmean | May 30, 1922 |
| 1,478,288 | MacGregor | Dec. 18, 1923 |
| 1,594,210 | Mann | July 27, 1926 |
| 2,333,711 | Dwiggins | Nov. 9, 1943 |